United States Patent
Placa et al.

(10) Patent No.: US 12,514,812 B2
(45) Date of Patent: Jan. 6, 2026

(54) WATER-IN-OIL EMULSIFIER DERIVED FROM NATURAL SOURCES

(71) Applicant: HALLSTAR BEAUTY AND PERSONAL CARE INNOVATIONS COMPANY, Chicago, IL (US)

(72) Inventors: Vincenzo Placa, Arcore (IT); Eva Maria Nerina Baldaro, Arcore (IT); Binaghi Valerio, Arcore (IT); Shengkui Hu, Darien, IL (US)

(73) Assignee: HALLSTAR BEAUTY AND PERSONAL CARE INNOVATION COMPANY, Chicago, IL (US)

( * ) Notice: Subject to any disclaimer, the term of this patent is extended or adjusted under 35 U.S.C. 154(b) by 393 days.

(21) Appl. No.: 18/033,103

(22) PCT Filed: Oct. 6, 2021

(86) PCT No.: PCT/US2021/053722
§ 371 (c)(1),
(2) Date: Apr. 21, 2023

(87) PCT Pub. No.: WO2022/086706
PCT Pub. Date: Apr. 28, 2022

(65) Prior Publication Data
US 2023/0381087 A1    Nov. 30, 2023

Related U.S. Application Data

(60) Provisional application No. 63/104,317, filed on Oct. 22, 2020.

(51) Int. Cl.
*A61K 8/06* (2006.01)
*A61K 8/92* (2006.01)
(Continued)

(52) U.S. Cl.
CPC ............... *A61K 8/92* (2013.01); *A61K 8/064* (2013.01); *A61K 31/25* (2013.01); *A61Q 17/04* (2013.01); *A61Q 19/007* (2013.01)

(58) Field of Classification Search
None
See application file for complete search history.

(56) References Cited

U.S. PATENT DOCUMENTS

| | | | |
|---|---|---|---|
| 5,773,073 | A | 6/1998 | Matsuda et al. |
| 2006/0165627 | A1 | 7/2006 | Allef et al. |
| 2010/0297047 | A1 | 11/2010 | Santus et al. |

FOREIGN PATENT DOCUMENTS

| | | |
|---|---|---|
| JP | H07305860 A | 11/1995 |
| WO | 2009056275 A1 | 5/2009 |

OTHER PUBLICATIONS

Shrestha et al., Langmuir, 2010, 26(10), pp. 7015-7024. (Year: 2010).*

(Continued)

*Primary Examiner* — Brian Gulledge
(74) *Attorney, Agent, or Firm* — Csaba Henter; Millen, White, Zelano & Branigan, P.C.

(57) ABSTRACT

Polyglycerol esters of natural oils fatty acids, which can be from a large variety of sources, e.g., olives, and of castor seed, which can be, e.g., polyricinoleic acid, which have water-in-oil emulsifier properties, processes of preparing the above compounds having water-in-oil emulsifier properties and the use of these polyglycerol esters as water-in-oil emulsifiers and/or dispersing agents for cosmetic, skin care and pharmaceutical formulations.

20 Claims, 2 Drawing Sheets

(51) Int. Cl.
*A61K 31/25* (2006.01)
*A61Q 17/04* (2006.01)
*A61Q 19/00* (2006.01)

(56) References Cited

OTHER PUBLICATIONS

International search report PCT/US2021/53722 dated Dec. 28, 2012 (pp. 1-2).
Josefa Bastida-Rodriguez.: "The Food Additive Polyglycerol Polyricinoleate (E-476): Structure, Applications and Production Methods", ISRN Chemical Engineering, vol. 2013, pp. 1-21, XP055605653, Retrieved from the Internet <URL:https://doi.org/10.1155/2013/124767> DOI: 10.1155/2013/124767.
Zhang et al.: "Synthesis, Characterization, Self-Assembly, and Irritation Studies of Polyglyceryl-. 10 Caprylates", Polymers, vol. 12, No. 294, Feb. 2, 2020 (Feb. 2, 2020), pp. 1-13, XP055936230, DOI: 10.3390/polym12020294.
European Search Report dated Oct. 15, 2024, issued in corresponding application EP 21883529 (pp. 1-2).
E.J. Vandenberg et al. "Poly(3-Hydroxyoxetane)—An Analog of Poly(vinyl Alcohol): Synthesis, Characterization, and Properties" Journal of Polymer Science: Part A: Polymer Chemistry, vol. 27, No. 9, Aug. 1989, pp. 3113-3149.
China National Intellectual Property Administration Office Action dated Jun. 25, 2025 issued in corresponding application 202180079631.5.

\* cited by examiner

WATER-IN-OIL EMULSIFIER DERIVED FROM NATURAL SOURCES

The present invention relates to polyglycerol esters of natural oils fatty acids, which can be from a large variety of sources, e.g., olives, various vegetables, sunflowers, e.g., high oleic sunflower oil, palm, soy, e.g., high oleic soy oil, safflower, e.g., high oleic safflower oil, cottonseed, canola, corn, rapeseed and linseed, and of polyacids derived from castor oil, which can be, e.g., polyricinoleic acid or polyhydroxystearic acid, which have water-in-oil emulsifier properties. The present invention in a preferred aspect relates to polyglycerol esters of olive oil fatty acids and polyricinoleic acid having water-in-oil emulsifier properties. Furthermore, the present invention relates to water-in-oil emulsifiers obtained by esterification with a polyglycerol mixture with some polyacids, where preferably these polyacids are obtained by esterification of polyricinoleic acids with natural fatty acids, which can be from a large variety of sources. Preferably, these natural fatty acids are derived from olive oil. The present invention also relates to the processes of preparing the above compounds having water-in-oil emulsifier properties and to the use of these polyglycerol esters as water-in-oil emulsifiers and/or dispersing agents for personal care (e.g. skin care, baby care, hair care, sun care, make up and toiletries) and pharmaceutical formulations.

Water-in-oil emulsions are commonly used for wide industrial applications, among which are personal care and pharmaceutical formulations. It is known that water-in-oil emulsions are difficult to obtain and to stabilize. However, water-in-oil emulsions are desirable for many personal care and pharma formulations, e.g., baby care products, rich lotions and creams, foundations and make-up applications, and sunscreens. Producing a stable water-in-oil emulsion represents a challenge for formulators, and much fewer emulsifiers are present on the market with respect to the more common oil-in-water emulsifiers. Water in oil emulsions are challenging for formulators because the water internal phase must be predominant on the external oil phase in order to obtain an emulsion that is pleasant to apply. Generally, it is desirable to obtain as light as possible water-in-oil emulsions, but most water-in-oil emulsifiers with or without other stabilizing agents produce a worsening effect on the feel on the skin. These ingredients produce a heavy and sticky feeling on the skin, so lighter water-in-oil emulsions are strongly requested by the market. In order to obtain light emulsion, some of these emulsions are stabilized by not natural emulsifiers, that contain polyethylene glycol portions (PEG) and/or silicone portions. However, the consumers are very informed on the ecological emergencies and request more natural ingredients derived from sustainable sources and with a good eco-toxicological profile.

Partial esters of polyalcohols and fatty acids have been used for many years as emulsifiers, but also dispersing and/or wetting agents and/or solubilizing agents. These properties are useful for a wide range of applications not only for the personal care, but also for home care, industrial, food and many others. Some polyglycerol esters are effective water-in-oil emulsifiers. However, the polyglycerol esters from natural fatty acids, for example some that derived from natural oils and in particular olive oil, have a nice and light skin feel showing also an excellent good skin compatibility on the skin. (see REF. U.S. Pat. No. 7,736,662B Natural Emulsifier for Cosmetics based on Olive Oil and see U.S. Pat. No. 8,637,056B2 Mixture of Fatty Acid Esters of Natural Origin and Its use in Cosmetic Preparations Based On Olive Oil Derivatives). In particular, the olive oil fatty acids composition is similar to the normal fatty acids skin composition, but these simple polyalcohol esters are usually not suitable as efficient water-in-oil emulsifiers and they always request strong co-emulsifiers that guarantees stability and efficacy, losing or reducing the light skin feel. Instead polyglycerol esters with polymerized unsaturated or/and saturated castor oil fatty acids (polyglyceryl polyricinoleate) (see REF. U.S. Pat. No. 5,736,581 Polyglycerol Polyricinoleates) guarantees stability and efficacy, but they are not suitable for a light skin feel, producing a heavy water-in-oil emulsions and the fatty acids profile is not similar to the skin composition. Some solutions have been proposed combining physically different polyglycerol esters in order to satisfy the desires of the market, but they do not completely satisfy the market requests.

This invention relates to a new chemical product that combines these raw materials maintaining the performance of polymerized castor oil fatty acids polyglycerol esters with the benefit of natural origin fatty acids and in particular from olive oil.

Nowadays the consumers are becoming more environmentally conscious, requesting natural products containing sustainable, natural and high skin compatible ingredients. The market trends desire products that maintain the high performances given from the traditional and non-natural ingredients using natural ingredients derived also from sustainable sources. So, for example many personal care products such as foundations, sunscreens, baby products once produced with non-natural ingredients are now undesirable. These trends represent a strong challenge for the chemical formulators because the old natural ingredients, proposed to the market, don't satisfy the skin feel benefits with high performances. Other trends define the necessity to simplify the consumer products using few ingredients that combine performance and perceptible skin benefits in a multifunctional way. In this aspect, the present invention relates to the discovery of some new water-in-oil emulsifiers which combine the high performance of polyglycerol esters of polyricinoleic acids (castor oil) with the known skin benefit of olive oil fatty acids permitting to satisfy the customers' necessity.

In some aspect, the present invention relates to water-in-oil emulsifiers obtainable by esterification of polyglycerol mixture with
  a) saturated and unsaturated polymerized castor oil fatty acid
  b) olive oil fatty acids or olive oil With the use of these innovative emulsifiers it is possible to achieve complete natural water-in-oil emulsions with the light skin feel typical of non-natural emulsions.

In some aspect, the present invention relates to some new polyglycerol esters obtained by an innovative pathway, where the polyglycerol is condensed with polyacids. These polyacids are the result of the esterification (synthesis) of the saturated and unsaturated polymerized castor oil fatty acids with olive fatty acids or olive oils.

In some aspect, the present invention relates to these emulsifiers that could be used to develop and to stabilize cosmetic and pharmaceutical products containing also non-natural ingredients such as silicone oils, mineral oils and polyethylene derivatives.

In some aspect, the present invention relates to these emulsifiers with advantageous properties for the formulators, in fact the present ingredients are homogeneous liquid ingredients, easy to use and to manage, enabling their use in cold process methods and formulations, which permits to reduce manufacturing cost and energy, but also to use thermolabile ingredients.

In some aspect, the present invention relates to these water-in-oil emulsifiers as surfactant agents with wetting and dispersing proprieties that could be used to disperse powders such as pigments, mineral filters, fillers and other particle ingredients for other industrial applications.

The amount of the emulsifier of the present invention used for achieving a smooth dispersion, e.g., very soft cream with a homogeneous surface, can be low, e.g., 1%, 1.2%, 1.5%, 1.8%, 2%, 2.5%, 3% or 5%, which depends on the nature of the dispersant, the oil phase used, as well as the particular emulsified used from within the scope of the invention. Preferred are amounts of about 1 to 3%, preferably 1.3 to 1.7%, particularly preferably about 1.5%.

The present invention, which relates to polyglycerol esters of polyricinoleic acid and olive oil fatty acids with water-in-oil emulsifier properties is described in detail.

In accordance with the present invention, the polyglycerol esters are suitable to produce surfactants with different properties according with the hydro-lipophilic balance (HLB) such as water-in-oil and oil-in-water emulsifiers or/and coemulsifiers, dispersing agents, wetting agents, solubilizers and detergents. They are the result of the complete or/and partial synthesis of polyalcohols with acids.

In accordance with the present invention, these polyalcohols are different grades of polyglycerol mixtures which are obtained, for example, by catalysed condensation of glycerol at elevated temperatures. (See Reference: U.S. Pat. No. 8,704,005B2—Methods for making polyglycerol. The synthesis of polyglycerine is widely known and several products are available on the market, e.g. SPIGA NORD Pure VEGETABLE POLYGLYCERINE-4, Solvay Polyglycerol-3.)

The suitable polyglycerols can be different polymers of glycerol (monomer). It is known that these polyglycerols are mixtures of different grade of polymerization of glycerol, it is widely recognized that the name "polyglycerol-n" or polyglycerine-n refers to the main species of polyglycerol that is present in the mixture, where "n" corresponds to the number of glycerol monomers. Accordingly, with the present invention, the used polyglycerol mixtures for the synthesis of the present invention the polyglycerol-n can be with "n" from 2 to 10. In some embodiments, the polyglycerol-n mixtures can be with "n" from 3 to 6. In some embodiments, the polyglycerol-n mixture can be with "n" like from 3 to 4.

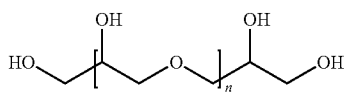

In accordance with the present invention, the polyglycerols are combined with acids. These acids derive from
1. polymerized saturated and/or unsaturated castor oil fatty acids
2. olive oil fatty acids and/or olive oil In some aspect of the present invention, the polymerized saturated and unsaturated castor oil fatty acids, also widely known such as polyricinoleic acids and/or polyhydroxystearic acids, are commonly prepared by known methods starting by castor oil and/or saturated and/or unsaturated castor oil fatty acids. The polymerization of these fatty acids produces an heterogenous mixture of polymers having a wide range of monomer repeats. It is known that the polymerization grade characterizes the properties of the polymer such as the water-in-oil stabilization. The right grade of polymerization could be controlled using the acid value of the end polymer. In accordance of the present invention, the polyricinoleic and/or polyhydroxystaric acids can be with an acid value from 110 mg KOH/g to 50 mg KOH/g. In some embodiments, the polyricinoleic acids can be with an acid value from 100 mg KOH/g to 50 mg KOH/g. In some embodiments, the polyricinoleic acids can be with an acid value from 55 mg KOH/g to 50 mg KOH/g.

It is known that these polymers are obtained by reacting ricinoleic acid, also known as 12-hydroxy-9-cis-octadecenoic acid, indeed it is the main composition of the castor oil fatty acids. As of a matter of fact the reaction of polymerization happens by reacting the hydroxyl group of one molecule with the carboxyl acid of the other one, like it is widely recognized by the people skilled in the art. However, during the polymerization process not all hydroxyl groups are consumed by the reaction and some defined part is still usable. Surprisingly, it has now been found that it is possible to react these hydroxyl group with olive oil fatty acids and/or olive oils obtaining the water-in-oil emulsifier described in the present invention and, surprisingly, this confers the possibility to improve the water-in-oil performance conferring also the skin benefits and the light skin feel widely recognised by the olive oil fatty acids. In accordance of the present invention, the polyricinoleic and/or polyhydroxystearic acids need to have hydroxyl groups free to be reacted with olive oil fatty acids and/or olive oil. It is widely known that hydroxyl number is commonly used to control the reaction and to evaluate the hydroxyl group suitable to react with olive oil fatty acids. In accordance of the present invention, the polyricinoleic and/or polyhydroxystearic acids can be with a hydroxyl number from 100 mg KOH/g to 30 mg KOH/g. In some embodiments, the polyricinoleic acids can be with a hydroxyl number from 60 mg KOH/g to 30 mg KOH/g. In some embodiments, the polyricinoleic acids can be with a hydroxyl number from 60 mg KOH/g to 40 mg KOH/g.

In accordance with the present invention, the olive oil fatty acids and/or olive oil are widely used to produce ingredients for several industrial applications such as personal care and pharmaceutical products. Indeed, the skin benefits and tolerance derived from olive oil derivatives are widely recognized. Several authors described the skin feel properties given by the olive oil derivatives. Furthermore, the olive oil supply chain is widely recognized as sustainable. In accordance with the present invention, the use of olive oil fatty acids and/or olive oil permits to obtain the new ingredient described into this invention. In some aspect of this invention, the olive oil fatty acids or olive oils derive from not edible fraction of olive oil. In some embodiments, the olive oil fatty acids derive from technical grade olive oils, such as Refined Olive Oil. In some embodiments, the olive oil fatty acids can be characterized by GC composition, where the composition of oleic acids can be 56-85% of total fatty acids.

In accordance with the present invention, it has been found that the high-performance ingredients, discussed in the present invention, can be obtained combining the water-in-oil performance of polyricinoleic and or polyhydroxystaric acids with olive oil emollience and with polyglycerol hydrating properties. These ingredients are suitable as emulsifier and/or stabilizer and/or wetting agent and/or dispersing agent for industrial application such as personal care product.

In some embodiment, these ingredients can be obtained mixing in one-pot all the raw materials. In order to synthetize the new ingredients, known catalysis methods, such as homogenous and heterogenous catalysts, also alkaline or acid catalysts, such as sulphuric acid, p-toluene sulfonic acid and methane sulfonic acid or potassium hydroxide, sodium hydroxide and sodium methoxide can be used. In some embodiment, these ingredients can be obtained warming from 100° C. to 200° C. for 6 hours to 12 hours, more precisely from 120° C. to 150° C. for 6 hours to hours.

The one-pot reaction can be represented by the following reaction scheme (polyglycerol-4 is used in all the following reaction schemes, but it can be polyglycerol-n, n being 2-10):

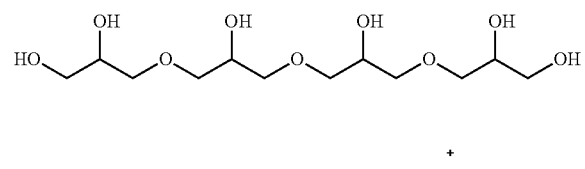 [SMILES: OCC(O)COCC(O)COCC(O)COCC(O)CO]

polyricinoleic acid is used in all the following reaction schemes, but it can be polyhydroxystearic acid,

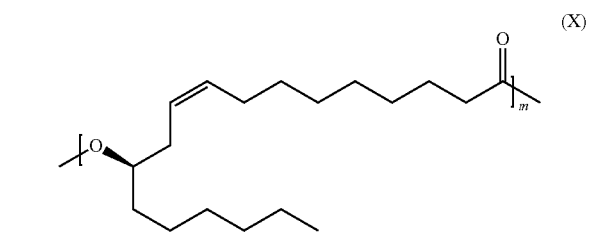

(X)

wherein m is an integer, preferably 2, 3, 4, 5, or 6, more preferably 2, 3 or 4, most preferably 3 and/or 4 oleic acid is used in all the following reaction schemes as the main fatty acid component of olive oil, but it can be also the other components of olive oil fatty acid e.g. palmitic, stearic, linoleic acid or a mixture thereof (Y)

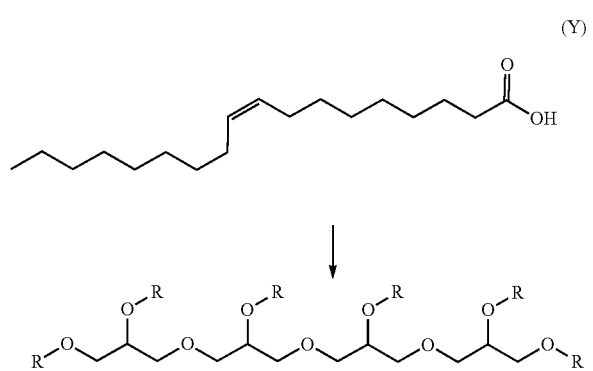

wherein the R groups are groups each formed randomly from either X or Y compounds to form X or Y and/or H (this last option represents unreacted OH groups, which remain free) or X-Y (which together form Z—see below) groups, e.g., as follows:

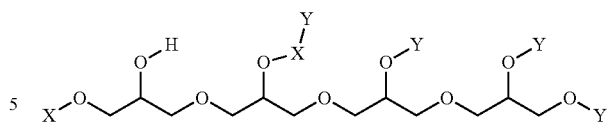

wherein the locations of X, Y, H and X—Y groups are random.

It is noted that not all R groups are replaced with X and Y. Indeed some OH of polyglycerol remain free. Preferably, the formation of a higher amount of X-Y combination (Z see below) is desired, however this reaction scheme does not appear to allow for the control over how much Z groups are formed. In sum, the formation of X-Y (Z) was perceived in the one pot synthesis approach, but it does not appear possible to control the formation of X-Y (Z).

In the one pot approach, the synthesis is done in a single process step, the polyglycerine-4, olive oil fatty acids and polyricinoleic and/or polyhydroxystearic Acids are melted and processed at same time.

There are certain advantages to this approach, such as an easy and fast reaction with a single reaction step.

There are also some disadvantages or at least non-preferred aspects to this approach. For example, applicants found that the side chains R are in a random arrangement of fatty acids. By this randomness, one has less control in producing perhaps a consistent product from one batch to the next.

In some embodiment, these ingredients can be obtained in two steps. 1$^{St}$ step polyglycerol is processed with one type of acid (olive oil fatty acid or polyricinoleic and/or polyhydroxystearic), the 2$^{nd}$ step the other type of acid is added to complete the synthesis. In order to synthetize the new ingredients, the known catalysis methods can be used, such as homogenous and heterogenous catalysis, also alkaline or acid catalysis, such as using sulphuric acid, p-toluene sulfonic acid and methane sulfonic acid or potassium hydroxide, sodium hydroxide and sodium methoxide. In some embodiment, this ingredient can be obtained warming from 100° C. to 200° C. for 6 hours to 12 hours, more precisely from 120° C. to 150° C. for 6 hours to 10 hours.

Thus, in this process, the synthesis is done in two steps. In the first step polyglycerine is processed with one of the types of acid (olive oil fatty acid or polyricinoleic or polyhydroxystearic acid), and in the 2nd step the other type of acid is added to the reaction.

This approach can be represented by the following reaction scheme:

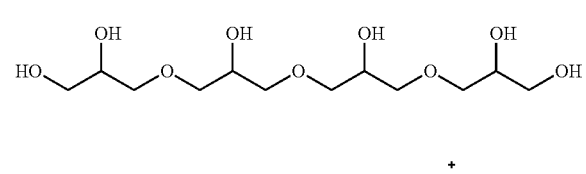 [SMILES: OCC(O)COCC(O)COCC(O)COCC(O)CO]

only one of X or Y

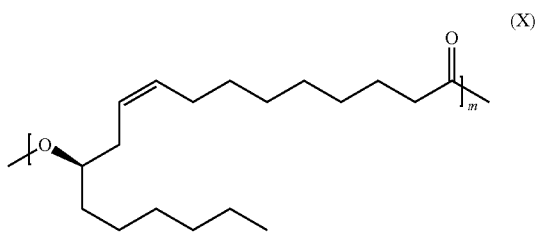

wherein m is an integer, preferably 2, 3, 4, 5, or 6, more preferably 2, 3 or 4, most preferably 3 and/or 4
or

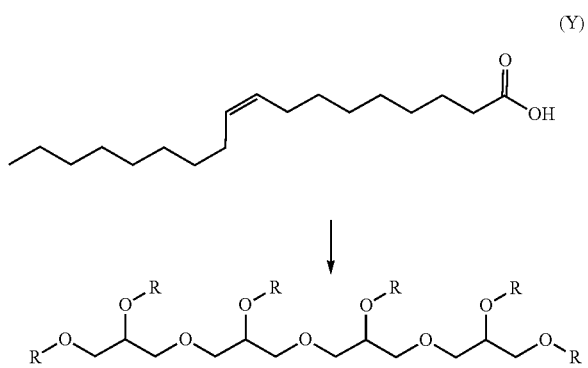

wherein the R groups are groups formed from only either X or Y compounds to form X or Y and/or H (which represent remaining unreacted OH groups) groups, e.g., as follows: which can look like the following compound if Y is reacted first:

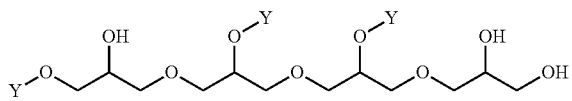

or the following compound if X is reacted first:

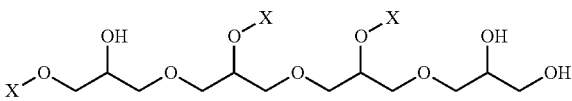

Noted here is that the reaction phases, including the amount of X or Y groups in the first reaction step as well as throughout each step of the process, are managed by the quantity of moles of reactants that one reacts and the end of reaction is checked by monitoring the acid value.

The non-reacted OH groups from the first step may later in the following step react with other acids added to the process.

Some reaction schemes have better performance than others depending from the different ratio of X and Y and/or starting acid. For example, it is more favourable to start with X, because it permits the increase the amount of obtained X-Y (Z) groups in the final product. However, considering that in the two step reaction the first reaction is not typically 100% completed before the addition of the second fatty acid (e.g., thus, there are free OH groups ready to react), X—Y groups are also formed even if olive oil fatty acid is the first to react.

The following step of the reaction process adds the other of the two acids not used in the first reaction step.

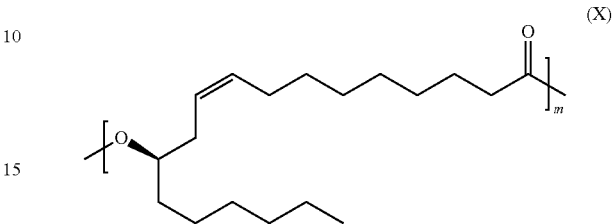

wherein m is an integer, preferably 2, 3, 4, 5, or 6, more preferably 2, 3 or 4, most preferably 3 and/or 4
or

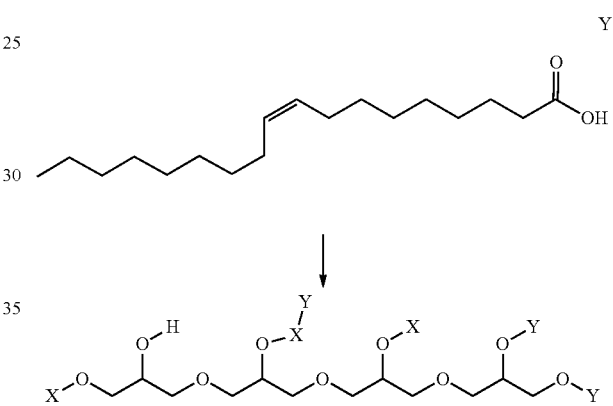

wherein the locations of X and Y groups are random, but less random than in the one pot reaction scheme, and there may be some unreacted OH groups remaining, and indeed there may also be some X-Y groups (one of each is present on the above compound to illustrate these possibilities).

There are certain advantages to this approach, despite there being a more complicated reaction scheme and corresponding reaction process. For example, the product produced by this approach lead to a reduction of the randomness of the final compounds obtained.

There are also some disadvantages or at least less preferred aspects when one proceeds by this reaction process. The reaction is clearly more complex as it requires two steps.

As provided in the reaction scheme above, one can start with either olive acids or poliricinoleic acids. The resultant product in each case can be similar.

In a preferred aspect, using X as a starting acid in the reaction is preferred. This approach leads to higher amounts of X-Y groups in the final product, which is preferred.

In some embodiment, these ingredients can be obtained in another pathway at 2 steps, during the $1^{st}$ step the polyricinoleic and/or polyhydroxystearic acids are condensed with olive oil acids obtaining polyacids, the $2^{nd}$ step these condensed polyacids react with polyglycerol. In order to synthetize the new ingredients, the known catalysis methods can be used, such as homogenous and heterogenous catalysts, but also alkaline or acid catalysts, such as sulphuric acid, p-toluene sulfonic acid and methane sulfonic acid or potassium hydroxide, sodium hydroxide and sodium methoxide. In some embodiments, this ingredient can be obtained warming from 100° C. to 200° C. for 6 hours to 12 hours, more precisely from 120° C. to 150° C. for 6 hours to 10 hours.

This approach is termed the polycondensated acids process. Here, the synthesis is done in two steps, but during the 1st step the polyricinoleic acids are condensated with Olive Oil Fatty Acids lengthening the lipophilic chain using the hydroxyl group of polyricinoleic/polyhydroxystearic group, i.e., the X-Y groups are formed first, and in the 2nd step these polycondensated acids react with polyglycerine-4.

This approach can be represented by the following reaction scheme:

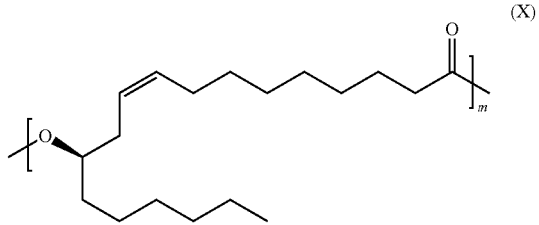

wherein m is an integer, preferably 2, 3, 4, 5, or 6, more preferably 2, 3 or 4, most preferably 3 and/or 4

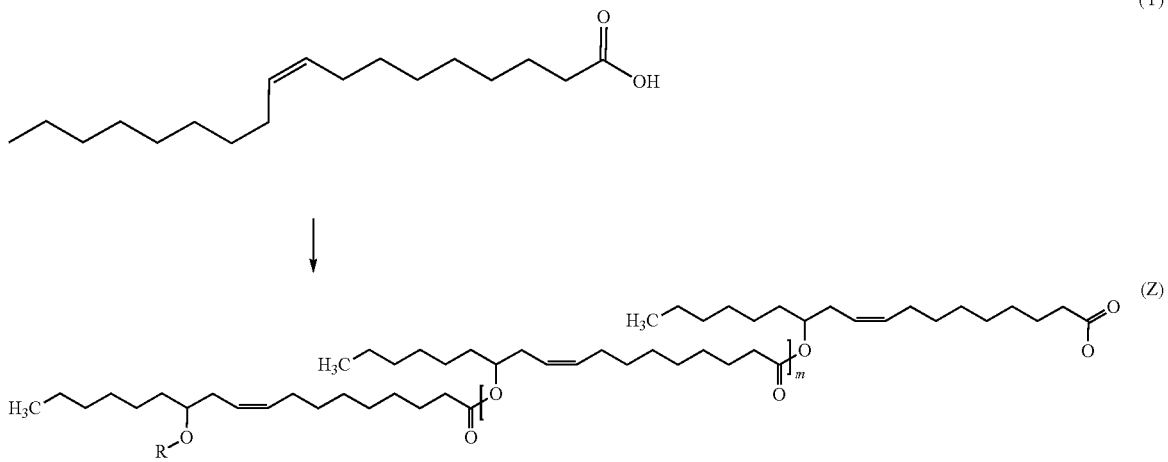

wherein R is the group formed from Y and m is as defined above, preferably 1 or 2
(since R is formed from Y, a more direct representation can be as follows:

This is, of course, the following molecule:

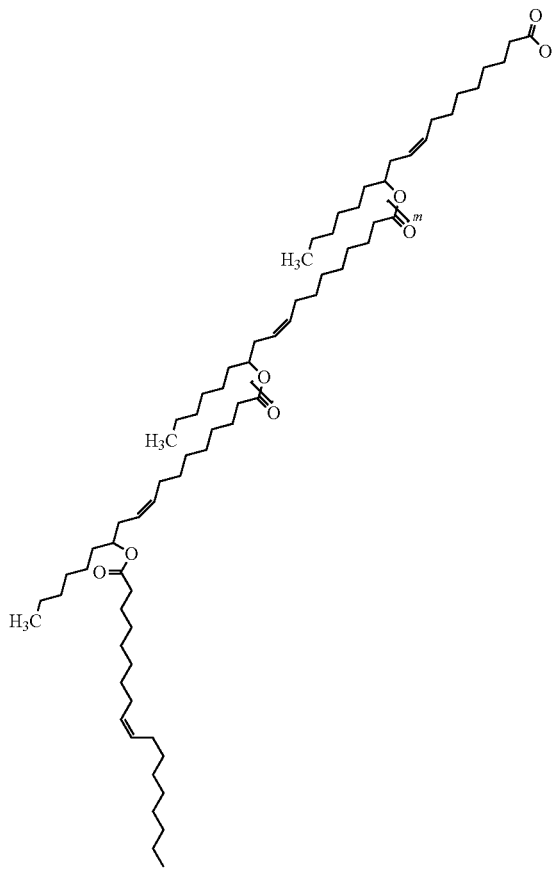

where m is as defined above, and is preferably 1 or 2.)

+

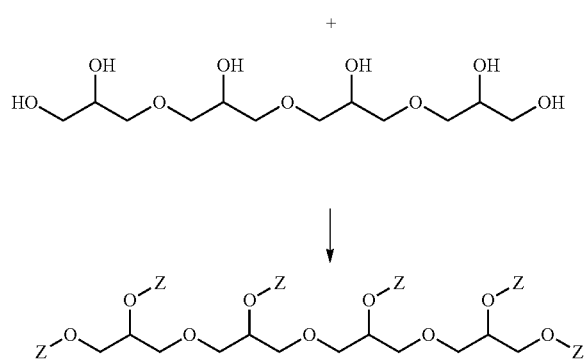

(Note: Some OH should remain unreacted in order to work as emulsifier, not all OH react with Z, these free or unreacted OH are needed to achieve the correct HLB (hydro-lipophilic balance))

This depiction above is the scenario where all OH groups are replaced by Z groups.

However, it is also possible, and indeed likely, that not all OH groups will react with Z, but that some will also react directly with Y or even previously unreacted X to form the following compound or remain unreacted

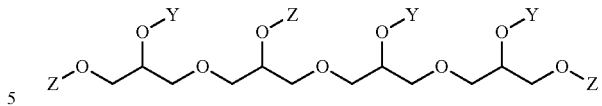

This is the scenario that predominantly occurs when one adds an excess of Y (olive oil fatty acids), as some will react with X in the first step, but there will be some unreacted Y remaining the reaction step's product. Then, in the next step, each of the excess amount Y (directly) as well as the previously reacted Y with X, i.e., X-Y, react in the next reaction step with polyglycerine, e.g., polyglycerine-4. Noted is that even though not shown above, there may be some free OH groups remaining as well as a few X groups that reacted with the polyglycerine-4 instead of having formed an X-Y group in the first reaction step.

This latter scenario with X being directly attached to polyglicerine (P) is more likely to occur if the reaction of the first step is not sufficiently complete before adding the polyglycenine.

As an exemplary depiction, the product may contain compounds as follows:

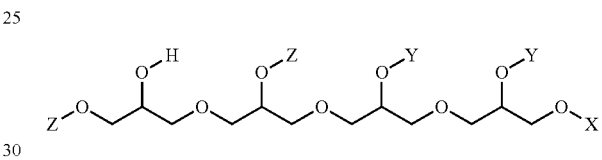

As indicated above, the nature of the product of the process can be controlled by the amount of each reactant used, as well as by the reaction process chosen from the above options.

Tested were different ratios of Olive Oil Fatty Acids (Y), Polyricinoleic acids (X) and Polyglycerol (P))

| Olive Fatty Acids (Y) | Polyricinoleic/polyhydroxystearic Acids (X) | Polyglycerol (P) |
| --- | --- | --- |
| From 0.5 to 3 | From 0.4 to 2 | 1 |

The most preferred ratio was 2.5(Y) Olive Fatty Acid:0.5 (X) Polyricinoleic Acid:1 (P) Polyglycerol, but also included are all variations of the ranges disclosed, and even broader variations in ratios of reactants is within the scope of the invention, e.g., all scenarios where Y is in excess of X and P, i.e., moles of Y>moles of X, leading typically to products that contain both −Y and −X-Y groups attached to P, for example, Y being 2 to 3, X being 0.2 to 0.8, while P being 1.

Thus, the resultant product may be defined by a range of the number of certain groups on the polyglycerol. For example, the ratio of Z to Y groups is preferably is 1:9 to 9:1, 1:8 to 8:1, 1:7 to 7:1, 1:6 to 6:1, 1:5 to 5:1, 1:4 to 4:1, 1:3 to 3:1, 1:2 to 2:1, 1:1.5 to 1.5:1, or 1:1, with all combination of the ends of these ranges being available to form new ranges, e.g., 2:1 to 1:1, 6:1 to 1:8, 1:5 to 9:1, etc.

And while these Z to Y ranges can be a measure of the nature or quality of the product obtained, it is noted that some OH and X groups may also be present on the polyglycerol, e.g., the amount of remaining unreacted OH groups may be less than 50% of the originally available OH groups on the polyglycerol, preferable less than 20%, less than 10%, more preferably less than 5%, less than 2% or even less, e.g., 1%. Likewise, the amount of X groups that directly replace H atoms on the OH groups is preferably less than 20%, less than 10%, more preferably less than 5%, less than 2% or even less, e.g., 1%.

Here too, there are clear advantages to this approach, for example, there is a significant reduction of the randomness of the final product in addition to better control of the amounts of particularly Z and Y groups, as well as X and OH groups on the polyglycerol.

The final product also has very good characteristics making is especially useful in cosmetics and skin products, for example, light and fresh skin feel, high stability and low tackiness or stickiness.

Thus, clearly, depending on the reaction path chosen and the amounts of reactants used, the final product is chemically different, but in each case within the scope of the invention disclosed herein.

The progressive reaction of conversion between the polyacids and the polyalcohol into the emulsifier, described into this invention, can be monitored in general by measuring the acid value. The acid value is progressively reduced to 10 or preferably below 5. A complete reaction permits to achieve the right hydro-lipophilic balance (HLB), it can be from 8 to 3 in order to obtain a performant water-in-oil emulsifier.

The resultant product is typically a low viscosity yellow liquid, which is easy to handle and usable in cold and/or hot processes to make stable formulations.

In accordance with the present invention, it has been found that the new ingredients are soft gel or liquid oil at 25° C. (room temperature). These viscosities are particularly advantageous because they permit to use easily to produce industrial formulation, such as personal care products without the necessity to heat the mixture, with considerable energy savings. In some embodiments, the emulsifiers of the present invention can have a viscosity about 25000 cP to about 500 cP. In some embodiments, the emulsifiers can have a viscosity about 5000 cP to 500 cP. In some embodiments, the emulsifiers can have a viscosity about 2000 cP to 1000 cP. The viscosity of the emulsifiers of the present invention can be measured using a viscometer (Brookfield viscometer RDV-E SPINDLE 5 RPM measured at 25° C.) and can be expressed as centipoise cP.

In accordance with the present invention, the appearance of these ingredients described in this invention can be opaque to clear, with a colour light yellow to amber. It is known that the colour can be evaluated using a colorimetric numerical scale like Gardner scale, the colour of this ingredient can be from 12 to 2, e.g., 3, 4, 5, 6, 7, 8, 9, 10 or 11.

In accordance with the present invention, these new ingredients are a surfactant with characteristic behaviours that permit to produce emulsions and dispersions, where these emulsions are water-in-oil emulsions. Water-in-oil emulsions are commonly known to have undesirable skin feel such as a strong oiliness and sticky effect. It was found that the emulsifiers, described in this invention, give an unexpected pleasant skin feel and improvement of stability of the emulsion. As a matter of fact, people skilled in the art, knows that producing stable and light water-in-oil emulsions is a challenge. With the term stability of emulsion we refer to the capacity of the emulsifier of the present invention to maintain the initial characteristics of the emulsion thus produced or the ability of the emulsion to resist to phases separation for long time (years), for example between the water phase and the oil phase, permitting to produce consumer applications such as personal care products. People skilled in the art knows that the stability of an emulsion can be evaluated using accelerated methods such as centrifuge analysis and/or medium-term stability at different temperature conditions (45° C., 4° C., etc).

It is widely recognized that the water-in-oil emulsion can be produced with different oil and water phase ratios, for example with about 70%, but also 80%, but also about 90% of the internal water phase. The emulsifier allows the water phase to be readily incorporated into the oil phase obtaining emulsions, that can be creams, lotions or milks, such as baby creams, sunscreen and other personal care products.

In accordance with the present invention, the emulsifiers herein discussed are suitable for the preparation of personal care products. A personal care product may comprise a sun care product, suntan lotion, exfoliants, cleaning pads, colognes, deodorants, lotion, shampoo, conditioners, skincare creams, moisturizers, toothpaste, cleansers, and shaving cream. In accordance with the present invention, the emulsifiers discussed are also suitable for the preparation of pharmaceutical products. For example, a pharmaceutical product may comprise a cream, an ointment, etc. In accordance with the present invention, the emulsifiers herein discussed are suitable for the preparation of industrial ingredients. For example, an industrial ingredient may be a cosmetic active ingredient, such as a vegetable extract, or semi-finished product such as colour dispersion or a mineral sunscreen filter dispersion.

Surprisingly it was found that the emulsifiers described into this invention can be efficiently used to produce light and stable emulsions and/or other personal care product with a wide range of personal care ingredients. In some embodiments, the emulsifiers can be used to produce emulsions with different types of ingredients, these ingredients can be included into the oil phase and the water phase. These ingredients may be natural, synthetic or minerals. It is widely recognized that the oil phase of emulsion may contains oils, waxes and other lipophilic ingredients, where these ingredients may be stabilizers, viscosity consistency factors, antioxidants, UV filters, active ingredients and preservatives. The water phase may contain stabilizers, salts, humectants, viscosity consistency factors, UV filters, active ingredients and preservatives. Other ingredients may be added to the preformed emulsion, such as texturing agents, pigments, colorants, active ingredients, parfums and fragrances. People skilled in the art know how to generally use correctly each ingredient into the right phase of the process to obtain a personal care product, e.g. a face cream or a body milk.

There are certain highly beneficial properties associated with the product disclosed herein. For example, these products are biodegradable as well as renewable as they are formed only from chemicals obtained from vegetable sources highly renewable and the process uses only minimal quantities of non vegetable sources like the catalysts.

Cosmetic and skin care products containing them not only have very good stability and a light skin feel without oiliness and/or stickiness, but they can be also palm free. The deforestation due to palm plantations is a big concern for the most attentive consumers, that always prefer that the cosmetic products they use do not damage the environment. All the components of the products of the present invention can be originated from olive fruit oil and from castor seed oil or other vegetable non palm origin oils.

The amount of emulsifiers according to the present invention based on the weight of the total formulation is about 0.1 to 20%, preferably 0.5 to 10%, more preferably from 1 to 5% and most preferably 2, 3 or 4%.

The new W/O emulsifier based on Olive oil chemistry using the herein disclosed technology (polyglycerol esters)

are in some embodiments used as the only emulsifier in formulation or can be used in combination with other emulsifiers.

In an aspect 1, preferred are thus a composition containing compounds of formula

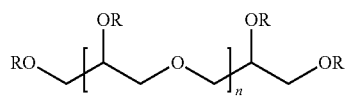
(II)

wherein
n is 2 to 10,
R is, each independently,
  H,
  X, which is a polyacid derived preferably from castor oil,
  Y, which is a natural oil fatty acid whose main component is oleic acid or a synthetic equivalent thereof, preferably a natural oil fatty acid whose main component is oleic acid, where the natural oil fatty acid preferably contains a mixture of fatty acids, e.g., typically found in olive oil or other natural sourced oils, or
  Z, which is a polyacid X that has attached thereto a group Y forming X-Y,
wherein
  at least one R is X and at least one R is Y, or
  at least one R is Y and at least one R is Z or
  at least one R is Y and at least one R is X and at least one R is Z.

In an aspect 2, preferred are thus also a composition containing compounds of formula (I)

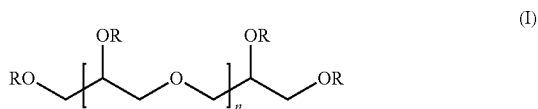
(I)

wherein
n is 2 to 10,
R is, each independently,
  H,
  X, which

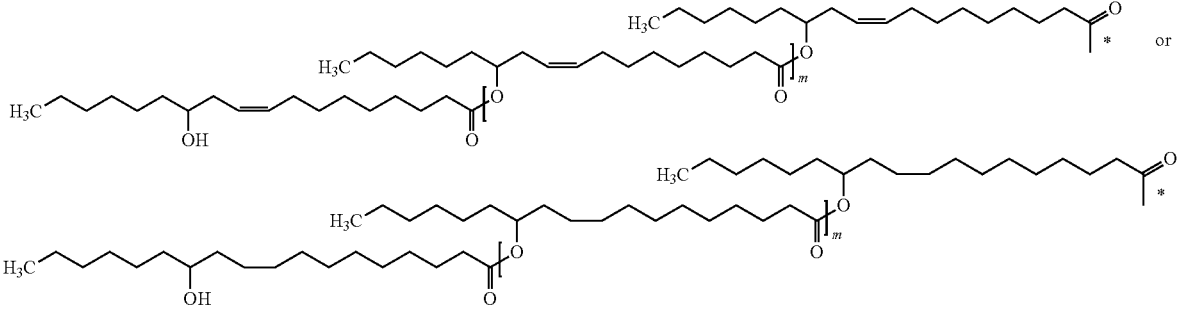

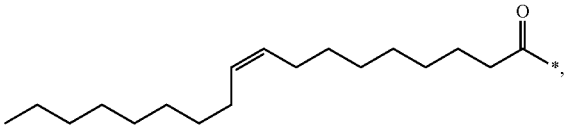

Y, which is a natural oil fatty acid whose main component is oleic acid, where the natural oil fatty acid preferably contains a mixture of fatty acids, e.g., typically found in olive oil or other natural sourced oils

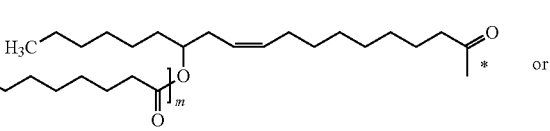

or
Z, which is

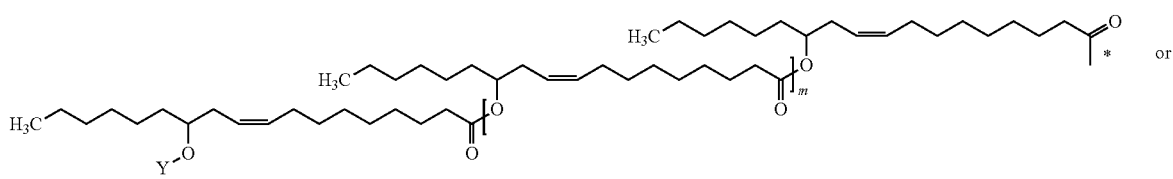

-continued

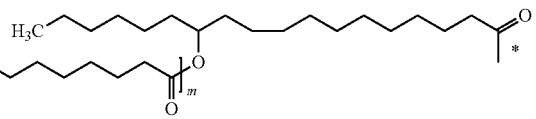
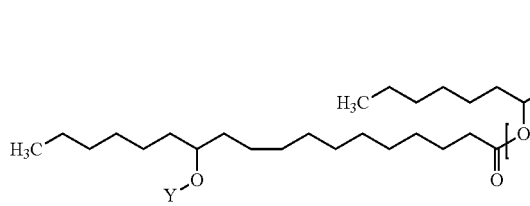

m is 1 to 5, preferably 1.5, and
* is the point of attachment
wherein
at least one R is X and at least one R is Y, or
at least one R is Y and at least one R is Z,
at least one R is Y and at least one R is X and at least one R is Z.

Preferred are also a composition according to aspect 2, which is polyglyceryl-4 copolymer of Olive oil fatty acids and Polyacids from castor oil Preferred are also a composition according to aspect 1, wherein n is 2 or 3.

Preferred are also a composition according to aspect 2, wherein m is 1 or 2, preferably 1.5.

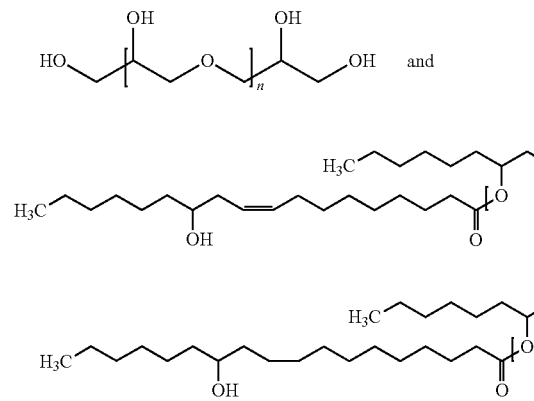

Preferred are also a composition according to aspect 2, wherein at least 30% of R groups is X and Y groups, preferably at least 40%, more preferably at least 50%, but it can be higher also, e.g., at least 60%, at least 70% or even higher including up to all OH groups having been replaced on the polyglycerine by X and Y groups (although this is not typical), e.g., wherein preferably from 40 to 60% of R groups is X and Y groups, and more preferably about 50% of R groups is X and Y groups.

Preferred are also a composition according to aspect 2, wherein the number of Y groups are the same or higher than the number of X groups, preferably higher, and more preferably higher by 3 to 7 fold, 4 to 6 fold, most preferably 5 fold.

Preferred are also a composition according to aspect 2, wherein at least 30% of R groups is Y and Z groups, preferably at least 40%, more preferably at least 50%, but it can be higher also, e.g., at least 60%, at least 70% or even higher including up to all OH groups having been replaced on the polyglycerine by Y and Z groups (although this is not typical), e.g., wherein preferably from 40 to 60% of R groups is Y and Z groups, and more preferably about 50% of R groups is Y and Z groups.

Preferred are also a composition according to aspect 2, wherein the number of Z groups are the same or higher than the number of Y groups, i.e., (the number of Z)>(the number of Y) groups on the polyglycerine.

Preferred are also a composition according to aspect 2, wherein at least 30% of R groups are X, Y and/or Z groups, preferably at least 40%, more preferably at least 50%, e.g., at least 60% or even higher, e.g., at least 70%, including ranges between these values, e.g., 40 to 60% of R groups being X, Y and/or Z groups, e.g., about 50% of R groups being X, Y and/or Z groups.

Further preferred is a method for preparing the composition containing compounds of formula (I) according to aspect 2, comprising reacting in one pot the following compounds

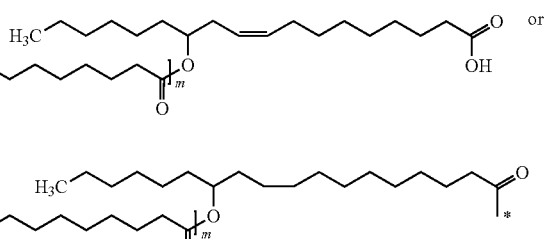

and
a natural oil fatty acid whose main component is oleic acid or a synthetic equivalent thereof, preferably a natural oil fatty acid whose main component is oleic acid, where the natural oil fatty acid preferably contains a mixture of fatty acids, e.g., typically found in olive oil or other natural sourced oils

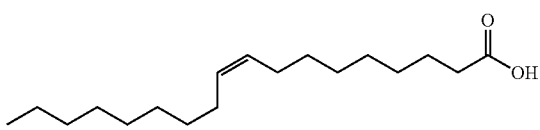

wherein n and m are defined as for the compound of formula (I).

Further preferred is a method for preparing the composition containing compounds of formula (I) according to aspect 2, comprising reacting

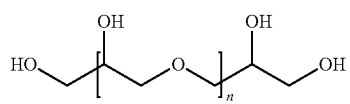

with only one of the following compounds a) or b) in a first reaction step with a natural oil fatty acid whose main component is oleic acid or a synthetic equivalent thereof, preferably a natural oil fatty acid whose main component is oleic acid, where the natural oil fatty acid preferably contains a mixture of fatty acids, e.g., typically found in olive oil or other natural sourced oils

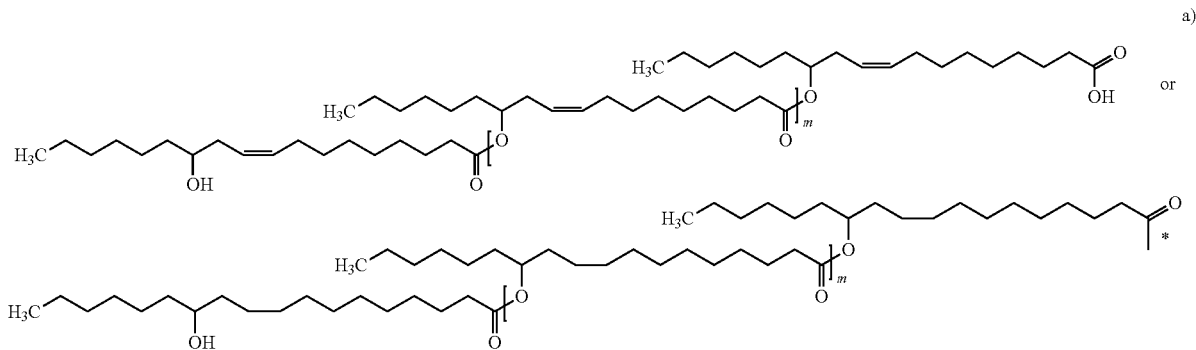

a)

or
b)
a natural oil fatty acid whose main component is oleic acid or a synthetic equivalent thereof, preferably a natural oil fatty acid whose main component is oleic acid, where the natural oil fatty acid preferably contains a mixture of fatty acids, e.g., typically found in olive oil or other natural sourced oils

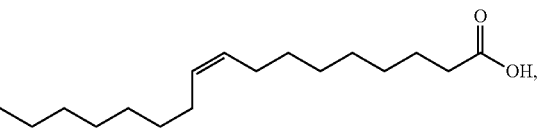

followed by reacting the resultant product of the first reaction step with

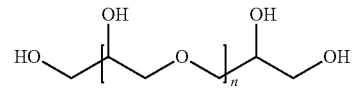

in a second reaction step,
wherein n and m are defined as for the compound of formula (I).

Also preferred is a water in oil emulsion, comprising the composition according to aspect 2 as the emulsifier.

Furthermore preferred is a method for preparing an emulsion, comprising bringing together an effective amount of wherein n and m are defined as for the compound of formula (I)
followed by reacting with the other of the above compounds a) or b) that was not reacted in a second reaction step.
Additionally preferred is a method for preparing the composition containing compounds of formula (I) according to aspect, comprising reacting in a first reaction step

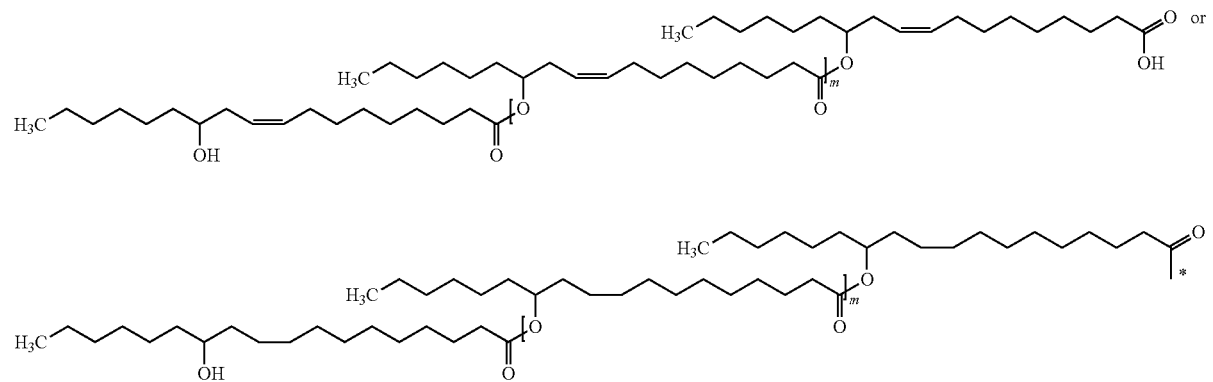

the composition according to aspect 2 with water and oil to form a water in oil formulation.

In further preferred aspects, the invention disclosed includes a personal care, topical or pharmaceutical composition or preparation, comprising a composition according to aspect 2 and one or more carriers or auxiliaries which are acceptable in a personal care, topical or pharmaceutical composition or preparation.

Also preferred is an industrial preparation, comprising a composition according to aspect 2.

SYNTHESIS EXAMPLES

Figure 1:
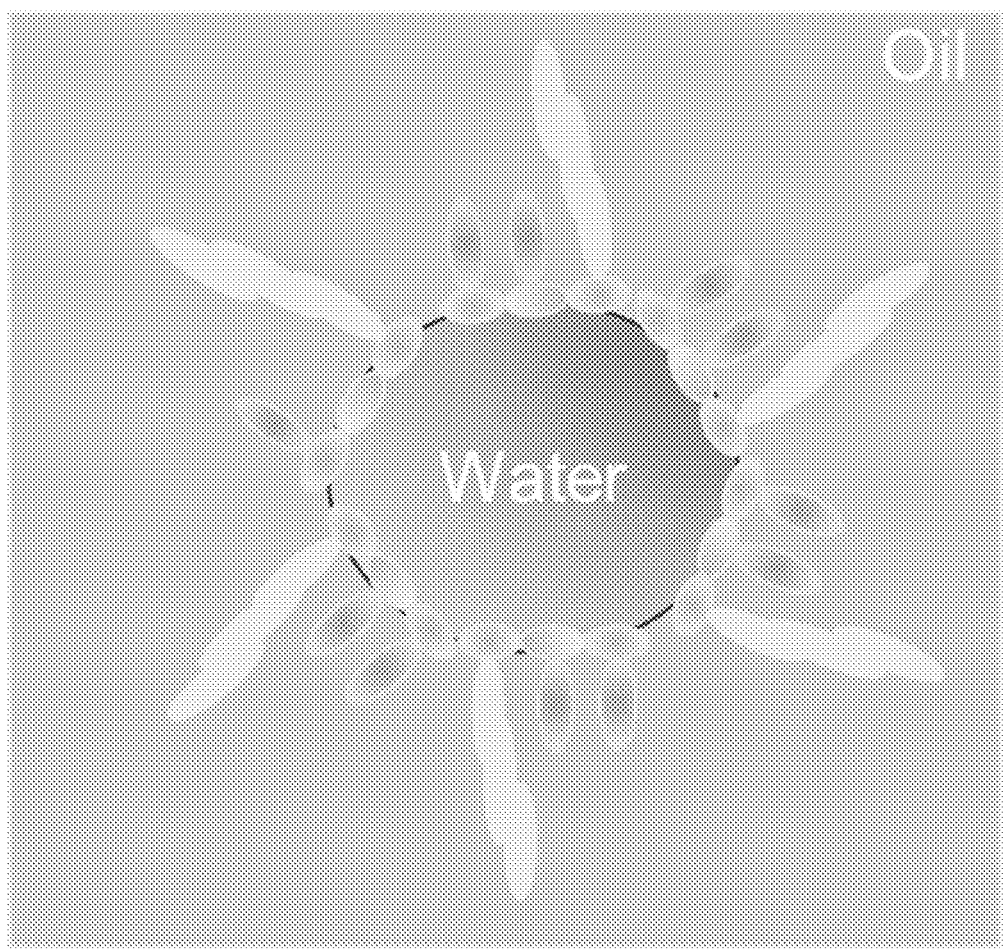
FIG. 1 illustrates the water in oil arrangement of the compounds of the two step reaction scheme showing water entrapped in an envelope of the product of this reaction in an oil phase, with the polyglycerol-4 backbone part of the compounds providing the envelope part, having sidechains extending into the oil phase, where the longer sidechains are formed from polyricinoleic acids and the shorter side chains are formed from olive oil fatty acids.
Figure 2:
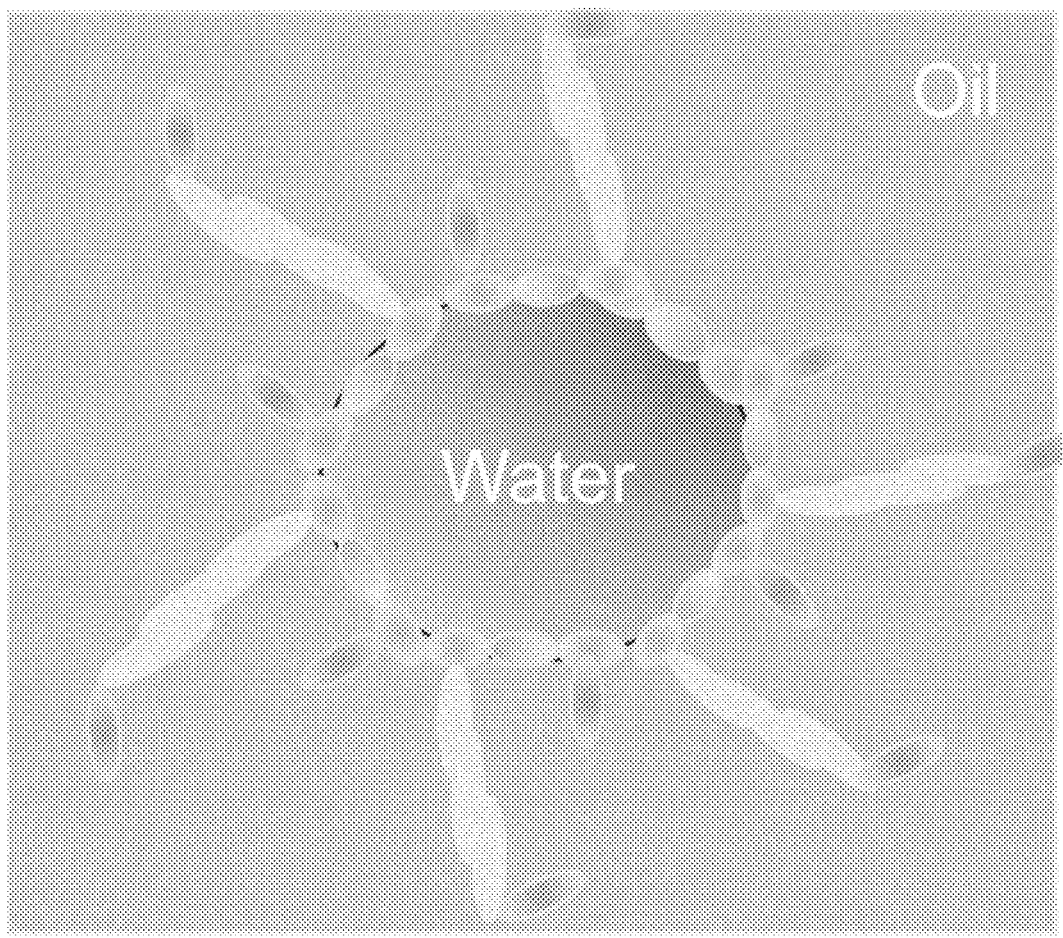
FIG. 2 illustrates the water in oil arrangement of the compounds of the polycondensated two step reaction scheme showing water entrapped in an envelope of the product of this reaction in an oil phase, with the polyglycerol-4 backbone part of the compounds providing the envelope part, having sidechains extending into the oil phase, where the longer sidechains are formed from polyricinoleic acids to which terminal olive oil fatty acids attached and the shorter side chains are formed from further olive oil fatty acids.

MSA=Methane Sulphonic Acid
pTSA=para Toluene Sulphonic Acid

Example 1 (One-Pot Reaction)

In a round-bottom flask put under stirring and under vacuum 21.1 g of polyglycerol-4, 16.2 g of olive oil fatty acids and 41.2 g of polyricinoleic acid. The initial acidity was 71 mg KOH/g. The reaction was catalyzed by 0.08 g of MSA (70% w/w). After a reaction time of about 5 hours at temperature between 25° C. And 135° C., the mixture was cooled to 25° C. under stirring. At the end of the reaction the acidity was below 10 mg KOH/g. The product is an amber viscous liquid.

Example 2 (Two Step Reaction)

In a round-bottom flask put under stirring and under vacuum 21.1 g of polyglycerol-4 and 131.6 g of polyricinoleic acids. The initial acidity was 49 mg KOH/g. The reaction was catalyzed by 0.46 g of pTSA. After a reaction time of about 3 hours at temperature between 25° C. and 145° C. the acid value was below 10 mg KOH/g. The mixture was cooled to 25° C. under stirring. 18.6 g of Olive Oil fatty acids were added to the bulk, the reaction proceeds under stirring and under vacuum for another reaction time of about 2 hours at temperature between 100° C. and 145° C. At the end of the reaction the acidity was below 10 mg KOH/g. The product is an opaque yellow viscous liquid.

Example 3 (Polycondensation Reaction)

In a round-bottom flask put under stirring and under vacuum 47.2 g of olive oil fatty acids and 33.4 g of polyricinoleic acids. The initial acidity was 142 mg KOH/g. The reaction was catalyzed by 0.12 g of MSA (70% w/w). After a reaction time of about 3 hours at temperature between 250 and 140° C. At the end of this step the acid value was below 130 mg KOH/g. The mixture was cooled to 25° C. under stirring. 51.6 g (0,068 mol) of polyglycerol-10 were added to the bulk, the reaction proceeds under stirring and under vacuum for another reaction time of about 10 hours at temperature between 25° and 140° C. At the end of the reaction the acidity was below 10 mg KOH/g. The product is an opaque yellow viscous liquid.

Example 4 (Polycondensation Reaction)

In a round-bottom flask put under stirring and under vacuum 47.2 g of olive oil fatty acids and 33.4 g of polyricinoleic acids. The initial acidity was 142 mg KOH/g. The reaction was catalyzed by 0.12 of MSA (70% w/w). After a reaction time of about 2 hours at temperature between 25° C. and 140° C. the acid value was below 130 mg KOH/g. The mixture was cooled to 25° C. under stirring 21.4 g (0,068 mol) of polyglycerol-4 were added to the bulk, the reaction proceed under stirring and under vacuum for about 10 hours at temperature between 25° C. and 140° C. At the end of the reaction the acidity was below 10 mg KOH/g. The product is an opaque yellow viscous liquid.

Example 5 (Polycondensation Reaction)

In a round-bottom flask put under stirring and under vacuum 47.2 g of olive oil fatty acids and 33.4 g of polyricinoleic acids. The initial acidity was 142 mg KOH/g. The reaction was catalyzed by 0.12 of MSA (70% w/w). After a reaction time of about 3 hours at temperature between 250 and 140° C. the acid value was below 130 mg KOH/g. The mixture was cooled to 25° C. under stirring 16.3 g (0,068 mol) of polyglycerol-3 were added to the bulk, the reaction proceeds under stirring and under vacuum for another reaction time of about 10 hours at temperature between 25° and 140° C. At the end of the reaction the acidity was below 10 mg KOH/g. The product is an opaque yellow viscous liquid.

Example 6 (Polycondensation Reaction)

In a round-bottom flask put under stirring and under vacuum 486.2 g of olive oil fatty acids and 363.0 g of polyricinoleic acids. The initial acidity was 140 mg KOH/g. The reaction was catalyzed by 1.3 g of MSA (70% w/w). After a reaction time of about 2 hours at temperature between 25° C. and 140° C. the acid value was below 130 mg KOH/g. The mixture was cooled to 25° C. under stirring 220.1 g (0.070 mol) of polyglycerol-4 were added to the bulk, the reaction proceeded under stirring and under vacuum for another reaction time of about 10 hours at temperature between 25° C. and 140° C. At the end of the reaction the acidity was below 10 mg KOH/g. The product is an opaque yellow viscous liquid.

Example 7 (One-Pot Reaction)

In a round-bottom flask put under stirring and under vacuum 21.1 g of polyglycerol-4, 16.2 g of olive oil fatty acids and 41.5 g of polyhydroxystearic acid. The initial acidity was 71 mg KOH/g. The reaction was catalyzed by 0.08 g of MSA (70% w/w). After a reaction time of about 5 hours at temperature between 25° C. and 135° C., the mixture was cooled to 25° C. under stirring. At the end of the reaction the acidity was below 10 mg KOH/g. The product is an amber viscous liquid.

Comparative Example 1=Polyglyceryl-3 Polyricinoleate
Comparative Example 2=Polyglyceryl-4 Olivate
Comparative Example 3=Physical blend of Polyglyceryl-4 Oleate and Polylglyceryl-3 Polyricinoleate (75% and 25%)

Application Examples

Water in Oil emulsions were prepared according to the Tables Application below. Water Phase A was prepared adding in a beaker one ingredient after the other and mixing. Prepare Oil Phase B adding in another beaker one after other the ingredients of the phase B and mix. Under homogenizer (e.g. Silverson homogenizer model L5M) at 2500-3000 rpm add Phase B to Phase A. Homogenize for 3 minutes and let the prepared emulsion stand for 24 h before measuring the viscosity and evaluating stability and sensoriality.

Stability Criteria:
No Pass=separation of oil and/or water
Pass=slight separation of oil and/or water
Stable=no separation of oil and/or water
Expert panelists apply the cream on the forearm skin, evaluating several sensorial parameters such as:
Greasiness=the skin feel is greasy such as an ointment
Lightness=the skin feel is extemporaneous and light such as a water gel
Stickiness=the cream tends to stick between the hand and the forearm Panelists give qualitative attributes to each sensorial parameter evaluated:
− Unpleasant
+ Pleasant
++ Very Pleasant

Example Application 1

| Emulsion Test with a mixture of oil (Natural, Synthetic, Mineral)-Performance | | | | | | | | | | | |
|---|---|---|---|---|---|---|---|---|---|---|---|
| Phase | | A | B | C | D | E | F | G | H | I | L |
| A | Dem. Water | 72.7 | 72.7 | 72.7 | 72.7 | 72.7 | 72.7 | 72.7 | 72.7 | 72.7 | 72.7 |
| | Magnesium Sulfate | 0.50 | 0.50 | 0.50 | 0.50 | 0.50 | 0.50 | 0.50 | 0.50 | 0.50 | 0.50 |
| | Glycerin | 4.00 | 4.00 | 4.00 | 4.00 | 4.00 | 4.00 | 4.00 | 4.00 | 4.00 | 4.00 |
| B | Comparative example 1 | 3.00 | — | — | — | — | — | — | — | — | — |
| | Comparative example 2 | — | 3.00 | — | — | — | — | — | — | — | — |
| | Comparative example 3 | — | — | 3.00 | — | — | — | — | — | — | — |
| | Example 1 | — | — | — | 3.00 | — | — | — | — | — | — |
| | Example 2 | — | — | — | — | 3.00 | — | — | — | — | — |
| | Example 3 | — | — | — | — | — | 3.00 | — | — | — | — |
| | Example 4 | — | — | — | — | — | — | 3.00 | — | — | — |
| | Example 5 | — | — | — | — | — | — | — | 3.00 | — | — |
| | Example 6 | — | — | — | — | — | — | — | — | 3.00 | — |
| | Example 7 | — | — | — | — | — | — | — | — | — | 3.00 |
| | Sweet Almond Oil | 6.60 | 6.60 | 6.60 | 6.60 | 6.60 | 6.60 | 6.60 | 6.60 | 6.60 | 6.60 |
| | Ethylhexyl Olivate (SENSOLENE ®) | 6.60 | 6.60 | 6.60 | 6.60 | 6.60 | 6.60 | 6.60 | 6.60 | 6.60 | 6.60 |
| | Paraffinum Liquidum | 6.60 | 6.60 | 6.60 | 6.60 | 6.60 | 6.60 | 6.60 | 6.60 | 6.60 | 6.60 |
| | Centrifuge (5000 rpm for 60 minutes) | Pass | No Pass | Pass | Pass | Stable | Pass | Stable | Stable | Stable | Stable |
| | Greasiness (Panel 4 experts) | − | ++ | − | − | − | + | ++ | + | ++ | + |
| | Lightness (Panel 4 experts) | − | ++ | − | ++ | ++ | ++ | ++ | ++ | ++ | + |
| | Stickiness (Panel 4 experts) | − | + | − | − | − | − | ++ | + | ++ | + |

All the examples have good stability results, showing good performance as emulsifier products.

Noted is that the skin feel of the products is affected by the different types of polyglycerol (3 or 4 or 10) used.

The results above demonstrate that when the products according to the present invention are used in an emulsion, they provide surprising and significant advantages over the various comparison examples. For example, when Polyglyceryl-3 Polyricinoleate i.e., the corresponding compound with only one side chains formed from polyricinoleic acids, was used as the emulsifier, the emulsion felt oily and sticky and not at all light. On the other hand, when Polyglyceryl-4 Olivate was used as the emulsifier, i.e., the corresponding compound with only one side chains formed from olive oil fatty acids, the emulsion felt improved in several characteristics, but the emulsion failed the stability test by the centrifuge. When a mixture approach was taken by using Polyglyceryl-4 Oleate and Polylglyceryl-3 Polyricinoleate (75%/25%), there were some improvements over the examples where only one of these were used, but the resultant emulsion was still not satisfactory as the emulsion felt oily and sticky and the lightness was low.

Example Application 2

| | Emulsion Test with a Natural Oil-Performance | M | N |
|---|---|---|---|
| A | Dem. Water | 72.5 | 72.5 |
| | Magnesium Sulfate | 0.50 | 0.50 |
| | Glycerin | 4.00 | 4.00 |
| B | Comparative example 1 | 3.00 | – |
| | Example 4 | – | 3.00 |
| | Sweet Almond Oil | 20.00 | 20.00 |
| | Centrifuge (5000 rpm for 60 minutes) | No Pass | Stable |
| | Long term Stability (Oven 45° C. for 1 Month) | No Pass | Stable |
| | Oiliness (Panel 4 experts) | – | ++ |
| | Lightness (Panel 4 experts) | – | ++ |
| | Stickiness (Panel 4 experts) | – | ++ |

The results above demonstrate that when the products according to the present invention are used in an emulsion, they provide surprising and significant advantages over the comparison example. In this Application Example it is demonstrated that the stability and sensoriality of the creams prepared using natural triglycerides is much improved using the emulsifier prepared according to the present invention than the traditional Polyglyceryl-3-Polyricinoleate

Example Application 3

| | Hand and Body Cream | O | P |
|---|---|---|---|
| A | Dem. Water | 73.2 | 73.2 |
| | Magnesium Sulfate | 1.00 | 1.00 |
| | Glycerin | 2.00 | 2.00 |
| B | Comparative example 1 | 2.00 | – |
| | Example 6 | – | 2.00 |
| | Sorbitan Olivate (OLIVEM ® 900) | 2.00 | 2.00 |
| | Ethylhexyl Olivate (SENSOLENE ®) | 6.00 | 6.006 |
| | Paraffinum Liquidum | 2.00 | 2.00 |
| | Ethyl Olivate (SENSOLENE ® Light ET) | 5.00 | 5.00 |
| | C15-C19 Alkane | 6.00 | 6.00 |
| | BHT | 0.10 | 0.10 |
| | Phenoxyethanol and Ethylhexylglycerin | 0.50 | 0.50 |
| | Fragrance | 0.20 | 0.20 |
| | Centrifuge (5000 rpm for 60 minutes) | Pass | Pass |
| | Long term Stability (Oven 45° C. for 1 Month) | Pass | Pass |
| | Oiliness (Panel 4 experts) | – | ++ |
| | Lightness (Panel 4 experts) | – | ++ |
| | Stickiness (Panel 4 experts) | – | ++ |

The results above demonstrate that when the products according to the present invention are used in an emulsion, they provide surprising and significant advantages over the comparison example. In this Application Example it is demonstrated that the stability and sensoriality of the complete and complex creams is much improved using the emulsifier prepared according to the present invention than the traditional Polyglyceryl-3-Polyricinoleate

Example Application 4

| | Lime and Tangerine Body Butter | |
|---|---|---|
| A | Dem. Water | 69.4 |
| | Magnesium Sulfate | 1.00 |
| | Glycerin | 2.00 |
| | Example 6 | 3.00 |
| | Sorbitan Olivate (OLIVEM ® 900) | 2.00 |
| | Ethylhexyl Olivate (SENSOLENE ®) | 6.00 |
| | Squalene | 2.00 |
| | Ethyl Olivate (SENSOLENE ® Light ET) | 6.00 |
| B | Prunus Amygdalus Dulcis (Sweet Almond) Oil, Hydrogenated Vegetable Oil, Citrus Aurantifolia (Lime) Peel Oil (BIOCHEMICA ® Lime Butter) | 2.50 |
| | Prunus Amygdalus Dulcis (Sweet Almond) Oil, Citrus Tangerina (Tangerine) Peel Oil, Hydrogenated Vegetable Oil (BIOCHEMICA ® Tangerine Butter) | 2.50 |
| | Silica | 2.00 |
| | Zinc Stearate | 1.00 |
| | BHT | 0.10 |
| | Phenoxyethanol and Ethylhexylglycerin | 0.50 |
| | Centrifuge (5000 rpm for 60 minutes) | Pass |
| | Long term Stability (Oven 45° C. for 1 Month) | Pass |
| | Oiliness (Panel 4 experts) | ++ |
| | Lightness (Panel 4 experts) | ++ |
| | Stickiness (Panel 4 experts) | ++ |

Example Application 5

| | Natural Diaper Paste | |
|---|---|---|
| A | Dem. Water | 62.9 |
| | Magnesium Sulfate | 1.00 |
| | Glycerin | 4.00 |
| | Panthenol | 2.00 |
| B | Example 6 | 3.50 |
| | Sorbitan Olivate (OLIVEM ® 900) | 3.50 |
| | Ethylhexyl Olivate (SENSOLENE ®) | 1.50 |
| | Lauryl Olivate (SENSOLENE ® Care DD) | 1.50 |
| | Caprylic/Capric Triglyceride | 10.00 |
| | Hydrogenated Castor Oil | 1.00 |
| | Lecithin, Tocopherol, Ascorbyl Palmitate, Citric Acid | 0.05 |
| | Phenoxyethanol and Ethylhexylglycerin | 1.00 |
| C | Zinc Oxide | 8.00 |
| | Centrifuge (5000 rpm for 60 minutes) | Pass |
| | Oiliness (Panel 4 experts) | ++ |
| | Lightness (Panel 4 experts) | ++ |
| | Stickiness (Panel 4 experts) | ++ |

Example Application 6

| | Mineral Sunscreen | |
|---|---|---|
| A | Dem. Water | 55.5 |
| | Sodium Chloride | 1.00 |
| | Butylene Glycol | 1.00 |
| B | Example 6 | 3.00 |
| | Sorbitan Olivate (OLIVEM ® 900) | 2.00 |
| | Dextrine Palmitate | 1.00 |
| | VP/Hexadecene Copolymer | 2.00 |
| | Butyloctyl Salicylate (HALLBRITE ® BHB) | 7.00 |
| | Ethylhexyl Methoxycrylene (SOLASTAY ® S1) | 5.00 |
| | Zinc Oxide | 22.00 |
| | Phenoxyethanol and Ethylhexylglycerin | 0.50 |
| | Centrifuge (5000 rpm for 60 minutes) | Pass |
| | Viscosity cP 10 rpm HLPT 92 (Brookfield DVE) | 20000 |

-continued

| Mineral Sunscreen | |
| --- | --- |
| Oiliness (Panel 4 experts) | ++ |
| Lightness (Panel 4 experts) | ++ |
| Stickiness (Panel 4 experts) | ++ |

In some aspect, the present invention relates to wetting and dispersing properties of the products of the products of the present invention that can be used to disperse powders such as pigments, mineral UV filters, fillers and other particle ingredients for industrial applications.

The products of the present invention improve the wetting properties of oils and increasing the wettability of the powders.

To 30 g of zinc oxide or Titanium dioxide 36 g of oil phase is added under propeller mixing at 450 rpm for 10 minutes. The oil phase is composed by 100% C12-15 alkyl benzoate or a mixture of C12-15 Alkyl benzoate and the product of Example 6.

The aspect of the preparation is defined according to the following visual scale:
1—adhesive paste: very thick and non-homogeneous paste, like putty
2—granular paste: thick and non-homogeneous paste
3—granular cream: creamy but with a non-homogeneous surface
4—glossy dispersion: creamy with a homogeneous surface
5—smooth dispersion: very soft cream with a homogeneous surface Example Dispersing Application 7

| Test | Powder | C12-15 alkyl benzoate | Example 6 | ASPECT |
| --- | --- | --- | --- | --- |
| Q | ZnO | 100% | 0% | 1-ADHESIVE PASTE |
| R | ZnO | 99.5% | 0.5% | 3-GRANULAR CREAM |
| S | ZnO | 98.5% | 1.5% | 5-SMOOTH DISPERSION |
| T | TiO2 | 100% | 0% | 1-ADHESIVE PASTE |
| U | TiO2 | 99.5% | 0.5% | 3-GRANULAR CREAM |
| V | TiO2 | 98.5% | 1.5% | 5-SMOOTH DISPERSION | from the above Example it is clear that the product of the present invention improves the dispersing performance of the oil phase.

Example Application 8

Skin Benefit

Skin hydration Evaluation after application of the following pure emulsifier on the forearm skin.

Example 6

Comparative Example 1: Polyglyceryl-3 Polyricinoleate

Comparative Example 4 (Silicone Emulsifier): Cetyl PEG/PPG-101/Dimethicone

Reference Natural Oil: *Olea europaea* (Olive) Fruit Oil

The aim of this study was to evaluate the moisturizing effect of the present invention with a Short Term Test. The Short-Term Test is important in efficacy studies because it could have a high discriminating power as it is possible to achieve an improvement of skin properties after a single application. The embodiment according to the present invention compared to a natural emulsifier (comparative example 1) and to a silicone emulsifier (comparative example 4), proved it to be effective in improving skin hydration after 1 hour and after 3 hours. Olive oil (*Olea europaea* (Olive) Fruit Oil), as it is known as a moisturizer, was used as hydrating reference oil.

The hydration efficacy was measured with MoistureMeter SC—Delfin. The skin is electrically a layered structure. The electrical properties of these layers are related to their water content. The probe head, the skin surface and the deeper skin layers form a structure, like an electrical capacitor. The measured capacitance is proportional to the water content of the surface layer of the skin. Higher measured value correlates with the moisture content of the stratum corneum. Hydration measurements of the stratum corneum give important information on the biophysical properties and function of the skin barrier. The MoistureMeter SC gives information that can be used to assess skin types and seasonal variations of the skin.

In this in-vivo research study, this non-invasive technique has been used to evaluate the moisturizing effect of a pure emulsifier, an embodiment according to this invention, in comparison with other W/O emulsifiers and olive oil. For this study were enrolled 12 volunteers, male and female, aged between 18 and 60 years old, with normal or dry skin. All volunteers had the following characteristics: good health, and absence of skin diseases. Pregnant and breast-feeding women were excluded from this study. Ethical principles for medical research were applied to this study.

From this study's results it is shown that the embodiment according to the present invention compared to a natural emulsifier (comparative example 1) and to a silicone emulsifier (comparative example 4), shows it to be effective in improving skin hydration after 1 hour and after 3 hours. The performance of the embodiment according to the present invention and the olive oil ingredient is very similar, and the statistical calculation shows that there is no difference in the first and third hour between these two products. With this, it is concluded that, by applying reference natural oil (olive oil) or an embodiment according to the present invention to the skin, the resulting skin hydration is comparable.

The Table below reports the normalization values obtained at T0 and after T1h and T3h:

| | T0 | | | |
| --- | --- | --- | --- | --- |
| 12 Volunteers | Example 6 | Comparative Example 4 | Comparative Example 1 | Reference Natural Oil |
| Media | 1.16 | 1.24 | 1.40 | 1.19 |

| | T1h | | | |
| --- | --- | --- | --- | --- |
| 12 Volunteers | Example 6 | Comparative Example 4 | Comparative Example 1 | Reference Natural Oil |
| Media | 38.05 | −23.93 | −20.19 | 27.25 |

| | T3h | | | |
| --- | --- | --- | --- | --- |
| 12 Volunteers | Example 6 | Comparative Example 4 | Comparative Example 1 | Reference Natural Oil |
| Media | 45.86 | 7.59 | 5.17 | 40.85 |

There is no statistical difference between the first and third hour of applying the embodiment according to the present invention, which is a good result, as well as it shows that hydration is maintained until the third hour after a single application. The application of emulsifiers (comparative example 1) and (comparative example 4) results in dehydration of the skin in the first hour after application. The improvement that is noted after the third hour is due to natural recovery of the stratum corneum layer. After damage, the skin itself naturally tends to recover, and that is what it is observed after three hours.

In the Table below Intergroup Statistical Analysis (MoistureMeterSC) (Student t test):

| Comparison sample versus sample | p-level |
|---|---|
| T0 Example 6 vs. T1h Example 6: | p < 0.01 |
| T0 Example 6 vs. T3h Example 6: | p < 0.001 |
| T1h Example 6 vs. T3h Example 6: | p ≥ 0.05 |
| T1h Example 6 vs. Comparative Example 4: | p < 0.001 |
| T1h Example 6 vs. T1h Comparative Example 1 | p < 0.001 |
| T1h Example 6 vs. T1h Reference Natural Oil: | p ≥ 0.05 |
| T3h Example 6 vs. Comparative Example 4: | p < 0.01 |
| T3h Example 6 vs. T3h Comparative Example 1 | p < 0.001 |
| T3h Example 6 vs. T3h Reference Natural Oil: | p ≥ 0.05 |

The data were analyzed using the one-tailed Student t test for paired data. The data is considered statistically significant when the value of the test is less than 0.5 (p<0.05):
n.s. not significant p≥0.05
* significant p<0.05
** very significant p<0.01
*** extremely significant p<0.001

Example Application 9

Sensoriality Benefit (QDA)

Example 6

Comparative Example 1=Polyglyceryl-3 Polyricinoleate

The results above demonstrate that when the products according to the present invention are used in an emulsion, they provide surprising and significant advantages over the various comparison examples evaluated also with QUANTITATIVE DESCRIPTIVE ANALYSIS carried out to quantify and compare some specific sensory characteristics of 2 different emulsions.

These experiments were performed by ten expert panellists according to a standard protocol.

The Quantitative Descriptive Analysis (QDA) is an objective and reliable technique in which the main sensory product attributes are identified and quantified in a reproducible way.

The perceived intensities of the selected attributes are assessed by each panellist and recorded by making a mark on a linear scale, 10 cm long, that represents the range of intensity of each attribute. For each attribute, they use different reference products corresponding to the extremes of the scale and to intermediate benchmarks. Different products are used as references to establish a scoring system for evaluation. Firstly, the score sheets filled by panellists are collected and the marks on the scales converted to scores, by measuring the distance of the mark from the left end of the line. Then, means and standard deviations are calculated and finally used to perform the statistical analysis.

| | Formulation Test-QDA | SAMPLE A | SAMPLE B |
|---|---|---|---|
| A | Dem. Water | 71.7 | 71.7 |
| | Magnesium Sulfate | 0.50 | 0.50 |
| | Glycerin | 4.00 | 4.00 |
| B | Comparative Example 1 | 3.00 | — |
| | Example 6 | — | 3.00 |
| | Caprylic/Capric Triglycerids | 10.00 | 10.00 |
| | Olea Europea (Olive) Fruit Oil | 5.00 | 5.00 |
| | Dicaprylyl Ether | 5.00 | 5.00 |
| | Hydrogenated Castor Oil | 0.50 | 0.50 |
| | Phenoxyethanol and Ethylhexylglycerin | 0.80 | 0.80 |
| | Centrifuge (5000 rpm for 60 minutes) | Pass | Pass |
| | Viscosity cP 10 rpm HLPT 92 (Brookfield DVE) | 24800 | 21450 |

| PARAMETERS | SAMPLE A | SAMPLE B | p-level |
|---|---|---|---|
| THICKNESS | mean 6.3 st. dev. ± 0.6 | mean 6.0 st. dev. ± 0.5 | p = 0.01 |
| SPREADING | mean 6.5 st. dev. ± 0.5 | mean 7.4 st. dev. ± 0.6 | p < 0.001 |
| LIGHTNESS | mean 2.3 st. dev. ± 0.3 | mean 3.2 st. dev. ± 0.3 | p < 0.001 |
| PLAY TIME | mean 4.8 st. dev. ± 1.0 | mean 5.8 st. dev. ± 0.8 | p < 0.001 |
| SILKY SKIN-FEEL | mean 2.7 st. dev. ± 0.4 | mean 3.6 st. dev. ± 0.3 | p < 0.001 |

Based on the obtained results the following conclusions are drawn: SAMPLE B is perceived as having lower thickness, a better spreading, a higher lightness, a better play time and a higher silky skin-feel than SAMPLE A. These results were all confirmed by the statistically analysis.

Example Application 10

Rheological Evaluation

The above results demonstrate that when the products according to the present invention are used in an emulsion, they provide surprising and significant advantages over the various comparison examples. RHEOLOGICAL AND TRYBOLOGY ANALYSIS were carried out to quantify and compare some specific sensory characteristics of the 2 different emulsions reported in the Example Application 11 using rheological equipment. The two formulations were evaluated using Rheology tests DHR2—TA Instruments: 40 mm crosshatched plate setup (500 μm testing gap) and Tribological testing DHR2—TA Instruments: three balls on plate.

The two emulsions are undistinguishable under static condition (below 10 sec-1). On the contrary when condition simulating the skin application of formulation are applied, Example 6, an emulsifier object of this invention, confers lower resistance to flow explaining the improvement of the spread on the skin and the play time, in accordance with the sensorially test of the application example 9.

| Viscosity | SAMPLE A | | | SAMPLE B | | | Δ |
|---|---|---|---|---|---|---|---|
| (Pa · s) at s$^{-1}$ | RUN 1 | RUN 2 | MEAN | RUN 1 | RUN 2 | MEAN | % |
| 1.0 | 66.85 | 60.84 | 63.85 | 68.38 | 64.53 | 66.46 | −4 |
| 10.0 | 11.55 | 10.78 | 11.16 | 10.75 | 10.17 | 10.46 | +6 |
| 100.0 | 2.61 | 2.56 | 2.58 | 2.18 | 2.08 | 2.13 | +18 |
| 1000.0 | 0.72 | 0.72 | 0.72 | 0.57 | 0.56 | 0.57 | +21 |

Tribological testing revealed that the samples have similar lubricating properties across the range of sliding speeds measured in this study, particularly at lower sliding speeds. At higher sliding speeds sample B provides increased lubricating properties.

| TRIBOLOGY | SAMPLE A | | | | SAMPLE B | | | | |
|---|---|---|---|---|---|---|---|---|---|
| Coefficient of Friction | RUN 1 | RUN 2 | RUN 3 | MEAN | RUN 1 | RUN 2 | RUN 3 | MEAN | Δ % |
| 10 mm/s | 0.0888 | 0.183 | 0.134 | 0.158 | 0.0886 | 0.0735 | 0.0525 | 0.063 | 60% |

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein are incorporated by reference herein.

The invention claimed is:

1. A composition containing compounds of formula (II)

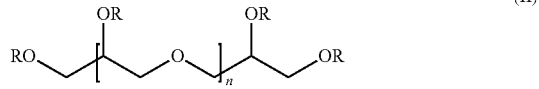

(II)

wherein
n is 2 to 10,
R is, each independently,
  H,
  X, which is a polyacid,
  Y, which is a natural oil fatty acid whose main component is oleic acid or a synthetic equivalent thereof, or
  Z, which is a polyacid X that has attached thereto a group Y forming X-Y,
wherein
at least one R is X and at least one R is Y, or
at least one R is Y and at least one R is Z or
at least one R is Y and at least one R is X and at least one R is Z.

2. A composition containing compounds of formula (I)

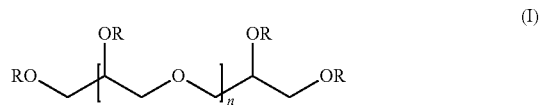

(I)

wherein
n is 2 to 10,
R is, each independently,
  H,
  X, which is

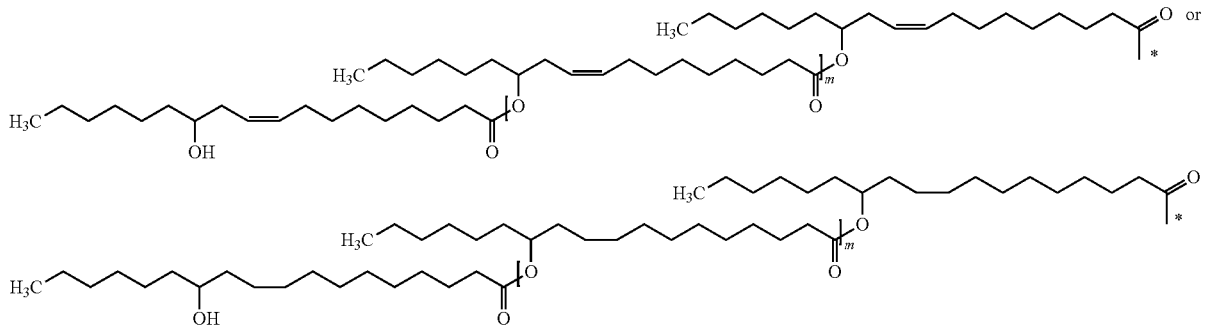

Y, which is a natural oil fatty acid whose main component is oleic acid

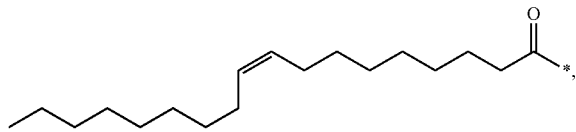

or
Z, which is

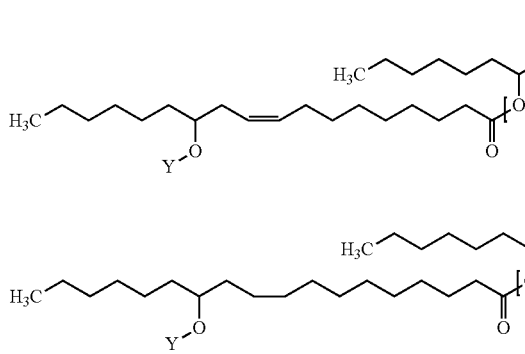

m is 1 to 5, and
* is the point of attachment
wherein
at least one R is X and at least one R is Y, or
at least one R is Y and at least one R is Z,
at least one R is Y and at least one R is X and at least one R is Z.

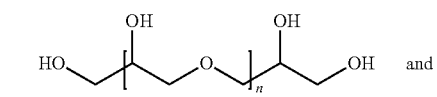

3. The composition according to claim 2, which is polyglyceryl-4 copolymer of Olive oil fatty acids and Polyacids from castor oil.

4. The composition according to claim 1, wherein n is 2 or 3.

5. The composition according to claim 2, wherein m is 1 or 2 or 1.5.

6. The composition according to claim 2, wherein at least 30% of R groups is X and Y groups.

7. The composition according to claim 2, wherein the number of Y groups are the same or higher than the number of X groups.

8. The composition according to claim 2, wherein at least 30% of R groups is Y and Z groups.

9. The composition according to claim 2, wherein the number of Z groups are the same or higher than the number of Y groups on the polyglycerine.

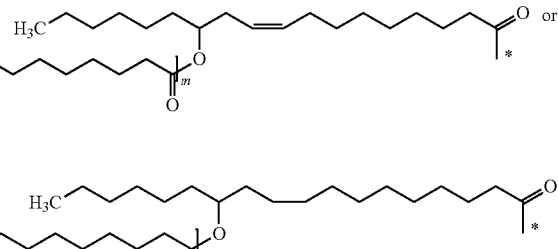

10. The composition according to claim 2, wherein at least 30% of R groups are X, Y and/or Z groups.

11. The composition according to claim 2, wherein 40% to 60% of R groups are X, Y and/or Z groups.

12. A method for preparing the composition containing compounds of formula (I) according to claim 2, comprising reacting in one pot the following compounds

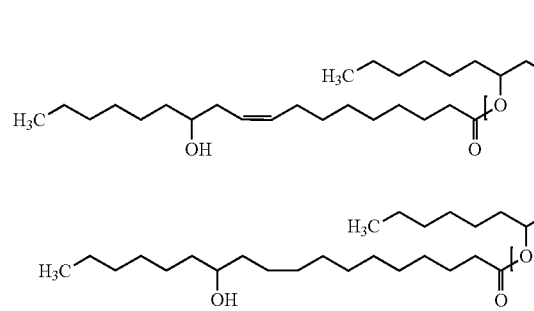

and
a natural oil fatty acid whose main component is oleic acid or a synthetic equivalent thereof
wherein n and m are defined as for the compound of formula (I).

13. A method for preparing the composition containing compounds of formula (I) according to claim 2, comprising reacting

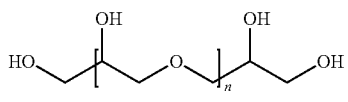
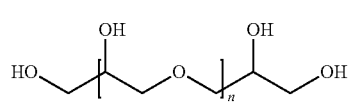

with only one of the following compounds a) or b) in a first reaction step a)

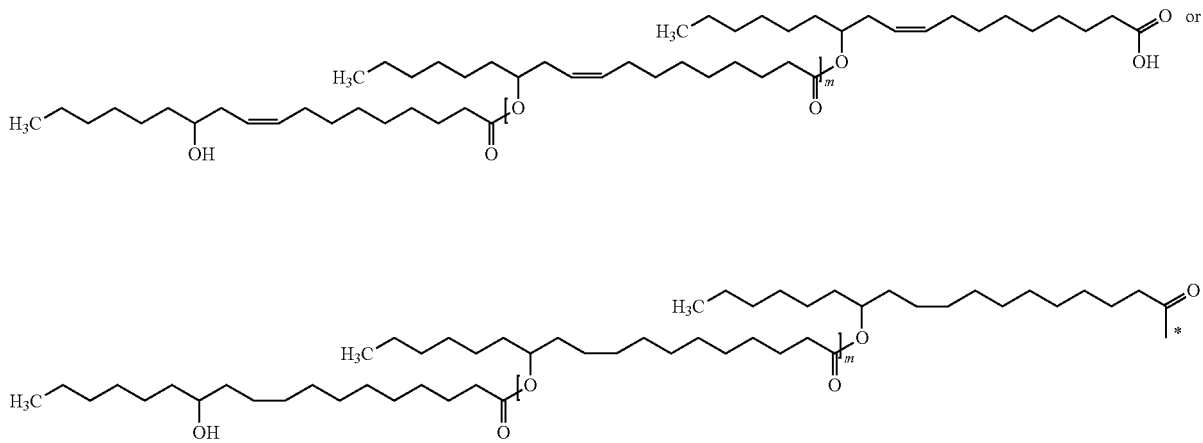

or
b)
a natural oil fatty acid whose main component is oleic acid or a synthetic equivalent thereof
wherein n and m are defined as for the compound of formula (I) followed by reacting with the other of the above compounds a) or b) that was not reacted in a second reaction step.

14. A method for preparing the composition containing compounds of formula (I) according to claim 2, comprising reacting in a first reaction step

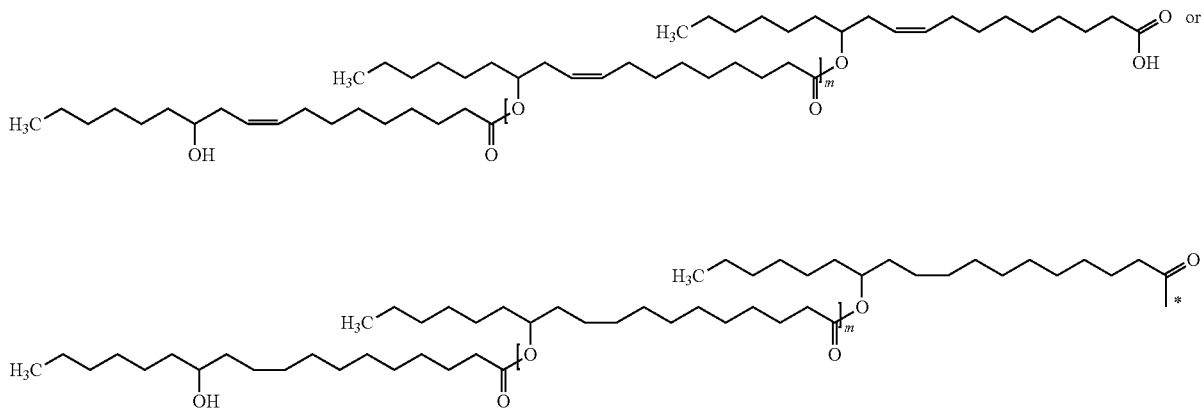

with
a natural oil fatty acid whose main component is oleic acid or a synthetic equivalent thereof
followed by reacting the resultant product of the first reaction step with in a second reaction step,
wherein n and m are defined as for the compound of formula (I).

15. A water in oil emulsion, comprising the composition according to claim 2 as the emulsifier.

16. A method for preparing an emulsion, comprising bringing together an effective amount of the composition according to claim 2 with water and oil to form a water in oil formulation.

17. A personal care, topical or pharmaceutical composition or preparation, comprising a composition according to claim 2 and one or more carriers or auxiliaries which are acceptable in a personal care, topical or pharmaceutical composition or preparation.

18. An industrial preparation, comprising a composition according to claim 2.

19. A personal care composition, comprising 1 to 3% of the composition according to claim 2 and one or more carriers or auxiliaries which are acceptable in a personal care compositions.

20. A water in oil emulsion, comprising the composition according to claim 1 as the emulsifier.

* * * * *